(12) United States Patent
Pettersson et al.

(10) Patent No.: US 8,537,372 B2
(45) Date of Patent: Sep. 17, 2013

(54) COORDINATE MEASURING MACHINE (CMM) AND METHOD OF COMPENSATING ERRORS IN A CMM

(75) Inventors: Bo Pettersson, London (GB); Knut Siercks, Mörschwil (CH)

(73) Assignee: Leica Geosystems AG, Heerbrugg (CH)

( * ) Notice: Subject to any disclaimer, the term of this patent is extended or adjusted under 35 U.S.C. 154(b) by 82 days.

(21) Appl. No.: 13/376,904

(22) PCT Filed: Jul. 2, 2010

(86) PCT No.: PCT/EP2010/059496
§ 371 (c)(1),
(2), (4) Date: Dec. 21, 2011

(87) PCT Pub. No.: WO2011/000955
PCT Pub. Date: Jan. 6, 2011

(65) Prior Publication Data
US 2012/0105866 A1   May 3, 2012

(30) Foreign Application Priority Data

Jul. 3, 2009  (EP) .................................. 09164602

(51) Int. Cl.
*G01B 11/14* (2006.01)
*G01B 5/008* (2006.01)
(52) U.S. Cl.
USPC ................................ 356/614; 33/503; 702/95
(58) Field of Classification Search
USPC ............. 356/601–623; 702/97, 151; 33/503, 33/556–561
See application file for complete search history.

(56) References Cited

U.S. PATENT DOCUMENTS

| | | | |
|---|---|---|---|
| 4,276,698 | A | 7/1981 | Dore et al. |
| 4,587,622 | A | 5/1986 | Herzog |
| 4,892,407 | A | 1/1990 | McMurtry et al. |
| 4,939,678 | A | 7/1990 | Beckwith, Jr. |

(Continued)

FOREIGN PATENT DOCUMENTS

| | | |
|---|---|---|
| EP | 1559990 A2 | 8/2005 |
| EP | 1687589 A1 | 8/2006 |

(Continued)

OTHER PUBLICATIONS

European Search Report dated Dec. 14, 2009 as received in related application No. 09 16 4602.
International Search Report dated Sep. 21, 2010 as received in PCT Application No. PCT/EP2010/059495.

*Primary Examiner* — Hoa Pham
(74) *Attorney, Agent, or Firm* — Maschoff Brennan

(57) ABSTRACT

A coordinate measuring machine for determination of at least one spatial coordinate of a measurement point on an object to be measured. The coordinate measuring machine comprises a stationary base, a probe head for approaching the measurement point and a frame structure for linking the probe head to the base. A first reference path is provided by an optical reference beam, wherein the reference beam extends along a guide of a linear drive mechanism so that the reference path is parallel to a first direction. Furthermore, at least one displacement sensor is assigned to the reference beam, the reference beam and the displacement sensor being designed and arranged in such a way, that a displacement of the movable member of the linear drive mechanism relative to the first reference path is measurable being indicative of a translational and/or rotational displacement of the movable member from its ordinary bearing position.

18 Claims, 9 Drawing Sheets

(56) References Cited

U.S. PATENT DOCUMENTS

| | | |
|---|---|---|
| 5,287,629 A | 2/1994 | Pettersson |
| 8,229,694 B2 * | 7/2012 | Nakagawa et al. .............. 702/95 |
| 2004/0231177 A1 | 11/2004 | Mies |
| 2011/0102808 A1 * | 5/2011 | Verdi et al. .................... 356/614 |
| 2012/0041712 A1 * | 2/2012 | Pettersson .................... 702/151 |
| 2012/0084989 A1 * | 4/2012 | Pettersson et al. .............. 33/503 |
| 2012/0167402 A1 * | 7/2012 | Verdi et al. .................... 33/503 |

FOREIGN PATENT DOCUMENTS

| | | |
|---|---|---|
| GB | 2042719 A | 9/1980 |
| GB | 2098759 A | 11/1982 |
| GB | 2425840 A | 11/2006 |
| WO | 2005/050134 A1 | 6/2005 |
| WO | 2009/001165 A | 12/2008 |

* cited by examiner

COORDINATE MEASURING MACHINE (CMM) AND METHOD OF COMPENSATING ERRORS IN A CMM

FIELD OF THE INVENTION

The present invention relates generally to a coordinate measuring machine (CMM) for determination of at least one space coordinate of a measurement point and to a method of compensating errors in a coordinate measuring machine (CMM) as set forth in the claims.

BACKGROUND

It is common practice after workpieces have been produced to inspect them on a coordinate positioning apparatus, such as a coordinate measuring machine (CMM) having a movable probe head within a working volume of the machine.

In a conventional three-dimensional measuring machine, the probe head is supported for movement along three mutually perpendicular axes (in directions X, Y and Z).

In a simple form of the machine a suitable transducer mounted parallel to each axis is able to determine the position of the probe head relative to a base of the machine and, therefore, to determine the coordinates of a measurement point on an object being approached by the probe.

There are several possible sources of error if such a technique is employed. Lack of straightness in movement and of orthogonality of the axes is one major cause of such errors. A further cause of error is the angular rotation of the carriages about axes perpendicular to their directions of movement. Such errors, often referred to as Abbé errors, depend not only upon rotation but also upon a lateral offset in the linear drive mechanisms.

Further sources of errors may include external influences like vibrations, temperature variation, pressure variation, humidity variation, aging of components of the CMM-frame-structure, etc.

Particularly, the following error factors may occur:
scale errors on axes,
horizontal straightness errors on axes,
vertical straightness errors on axes,
pitching errors on axes,
yawing errors on axes,
rolling errors on axes, and
angular errors between axes.

Also, weaknesses in the frame structure of the CMM—which may lead to a bending of e.g. the legs or the bridge of the CMM—cause errors.

Many attempts have been made to provide correction for the various sources of error referred to. For example, it is known to introduce a deliberate and known error into the transducers by various means. However, such corrections only apply for a given location in the measuring volume.

An alternative technique is to calibrate the machine, measuring the errors existing at various points and storing these so that they may be applied when the machine is actually used. Exemplarily in connection with such calibration methods, for each axis (x,y,z) and each linear drive mechanism, some axis dependent geometrical errors are measured—e.g. pitch, yaw, straightness (in two orthogonal axis) and roll. That measurement can be done by some kind of increment (for example every 20 mm), the gathered data is stored in a calibration table (in the machine or the software) and is used when running the machine in such a way, that the data in the table corrects the geometrical errors depending on the position. In addition to this there is of course the angularity between the axis (x,y,z) and some scale factor for each axis. The calibration method is usually carried out on a complete assembled machine.

As may be imagined, such a calibration process is lengthy, especially for a large machine. However, any "settling" of the machine during use would invalidate the calibrations. Another drawback with the calibration methods is that they will only take care of fully repeatable errors. It is also necessary to calibrate the probe during the same conditions as in the working state of the machine. This means that if the machine runs with 100 mm/sec, the calibration procedure also should be performed with that speed, and if—by some reason—a change of the running speed is necessary, a recalibration of the machine with this new speed would be required.

Another aspect which has to be considered is that accelerations of the probe cause dynamic deflections of the coordinate measuring machine which in turn cause measurement errors. These measurement errors may be reduced by taking measurements at low accelerations. However, productivity demands an increased throughput as well as an increased inspection speed. Hence, the probe experiences higher accelerations during the measurements and larger dynamic structural deflections of the system—in particular the frame structure of the CMM—result. This causes inaccurate reporting of the X,Y,Z geometric position of the probe.

In particular, some coordinate measuring machines exhibit significant drive vibration at high speed. One source of error causing the vibration is the machine mechanical drive system. Errors caused by these vibrations (typically above 5 Hz) are not suitable for calculative methods of compensation for dynamic errors described above as the vibration causes non repeatable behaviour at high speed which causes measurement errors.

Furthermore, a variety of probes are employed in a coordinate measuring machine for measurements within the scale coordinate system, which includes reference scales arranged along axes that configure the three-dimensional measuring space. To provide the coordinate measuring machine with an improved measurement precision, the structure of the frame thereof is required to have a high static stiffness.

Exemplary, EP 1 559 990 discloses a coordinate measuring system and method of correcting coordinates measured in a coordinate measuring machine. Thereby, geometrical errors are measured while works with various weights are mounted on the coordinate measuring machine. Compensation parameters are derived from measured results per a weight of a work and stored. A compensation parameter corresponding to a weight of a work to be measured is appropriately read out to correct measured coordinates of the work to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant, and determining the measurement error at the surface sensing device caused by the load.

Also, GB 2 042 719 discloses a measuring apparatus having three mutually perpendicular axes, wherein errors due to rotations about the various axes are corrected.

Another approach for error correction of work piece measurements with a coordinate measuring machine (CMM) is disclosed in GB 2 425 840. Thereby, position measurements are taken with a work piece sensing probe, in which means of measuring acceleration are provided. The measurements are corrected for both high frequency (unrepeatable) errors such as those due to vibration, and low frequency (repeatable) errors such as those due to centrifugal forces on the probe. The correction method comprises measuring the work piece, determining repeatable measurement errors from a predetermined error function, error map or error look-up table, measuring acceleration and calculating unrepeatable measurement errors, combining the first and second measurement errors to determine total errors and correcting the work piece measurements using the total errors. The predetermined error map is calculated using an artefact of known dimensions.

It is also known to use accelerometers fitted in the probe (or Z-column) of the machine and in the base table (for a differential measurement). The displacements and errors of the probe-position are measured with double integration, and from that it will be possible to adjust the reading with the difference between the double integrated signal and the scales.

However, when using accelerometers, they will usually become noisy when the frequency is relatively low. This can give a bad signal to noise ratio. Furthermore, it may only be possible to measure differences during acceleration, which means that—in general—it may be necessary to calculate the acceleration from the scale position and to compare it with the measured acceleration, and double integrate the difference. However, this may not be enough information to accurately calculate the exact position of the probe. Using such a method also doesn't allow measuring static changes (i.e. friction in combination with dynamic changes will not be considered).

SUMMARY

It is therefore an object of the present invention to provide an improved coordinate measuring machine CMM and method, wherein errors caused by dynamic affects (e.g. when running a high speed scanning), errors caused by week structures or static changes (e.g. changes introduced by friction or load onto the frame structure of the CMM) and/or errors caused by external influences (e.g. temperature variations, vibration, pressure) can be compensated for in an improved manner.

In particular, displacement errors in each linear drive mechanism (in the X,Y,Z directions) of the CMM and/or deflections and deformations (e.g. bending) in the frame structure of the CMM caused e.g. by the load, the movements and/or the accelerations of the probe should be recognized and compensated for precisely.

This object is achieved by realising the features of the independent claims. Features which further develop the invention in an alternative or advantageous manner are described in the dependent patent claims.

The present invention relates to a coordinate measuring machine (CMM) for determination of at least one spatial coordinate of a measurement point on an object to be measured. The CMM comprises at least a base (particularly a stationary base, e.g. a measurement table for supporting the object to be measured), a probe head for approaching the measurement point and a frame structure for linking the probe head to the base.

The frame structure comprises at least a first and a second frame component and at least one linear drive mechanism moveably linking the first and the second frame components in such a way, that the probe head is movable relative to the base in at least a first direction (X,Y,Z).

Therein, the at least one linear drive mechanism comprises a linear guide in the first direction, a movable member being supported for movement along the guide by bearings, and a linear measuring instrument for determination of a first drive position of the movable member in the first direction (X,Y,Z).

According to the invention, a first reference path in provided by at least a first optical reference element designed as an optical reference beam, wherein the reference beam extends along the guide of the linear drive mechanism so that the reference path is parallel to the first direction (X,Y,Z).

Furthermore, at least one displacement sensor is assigned to the reference beam, the reference beam and the displacement sensor being designed and arranged in such a way, that a displacement of the movable member relative to the first reference path is measurable being indicative of a translational and/or rotational displacement of the movable member from an ordinary bearing position.

Particularly, the displacement sensor can comprise a photosensitive detector element being built for measuring a distance to the reference beam and/or an impinging position of the reference beam, the distance respectively the impinging position being indicative of the displacement of the movable member relative to the first reference path in a direction perpendicular to the first direction (X,Y,Z).

In more detail, the displacement sensor may further comprise a beam splitter for coupling out at least a part of the reference beam and directing it onto the photosensitive detector element. Therein, the photo-sensitive detector element may exemplarily be built as CCD-array, CMOS-array, PSD or quadrant detector.

In case that—exemplarily—the linear guide is provided on or by the first frame component and the movable member is provided on or by the second frame component, a laser source may be installed on the first frame component providing for the reference beam and the at least one displacement sensor can be attached to the second frame component in such a way that it faces towards the laser source.

Therein, the laser source may for example be designed as a laser diode with collimation optics.

According to a further development of the invention, also two or more displacement sensors—particularly three to five—can be assigned to the reference beam, the reference beam and the displacement sensors being designed and arranged in such a way, that two or more distances from defined positions on the movable member to the reference beam and/or impinging positions of the reference beam are measurable by the displacement sensors, wherein the design is constructed so that the distances respectively impinging positions indicate translational and rotational displacements of the movable member from an ordinary bearing position.

The coordinate measuring machine (CMM) further comprises a calculation unit for determination of the space coordinate. According to the invention, not only the linear positions of the drive mechanisms (e.g. the first drive position of the first linear drive mechanism), but also the measured translational and/or rotational displacements of the movable member are considered for determination of the space coordinate.

Hence, the determination of the space coordinates is carried out as a function of at least the first drive position of the first linear drive mechanism and the translational and/or rotational displacements of the movable member from the ordinary bearing position.

According to the methodological aspects of the invention, the following steps are performed:

providing a first reference path parallel to the first direction (X,Y,Z) by generating an optical reference beam extending along the guide of the linear drive mechanism, measuring at least one displacement of the movable member relative to the first reference path so that the at least one displacement is indicative of a translational and/or rotational displacement of the movable member from an ordinary bearing position, and compensating errors occurring in connection with measurements performed by the inventive and above described CMM, particularly weaknesses in the bearing of the linear drive mechanism, by using the determined actual at least one displacement.

According to the invention, there will be no need (at least not necessarily) to carry out a separate and lengthy calibration procedure of the axis dependent geometrical errors on an assembled machine in advance—as known from the state of the art.

Hence, because the axis dependent geometrical errors can be sensed in parallel and concurrent to real measurements, the disadvantages of compensating for errors by performing a calibration method according to the state of the art (i.e. time extensive calibration process; different conditions invalidate the calibrations; only fully repeatable errors can be considered; etc.) can be removed or at least reduced significantly according to the invention.

According to further aspects of the CMM of the invention, not only an optical reference beam (i.e. the first optical reference element) may be provided, but also a second or more reference elements may be arranged on the frame structure, each for providing a substantially unloaded reference path along a part of the frame structure, wherein at least one displacement sensor, in particular two to five displacement sensors, can be assigned to each of the reference elements. According to a more general scope, the reference elements and the displacement sensors are then designed and arranged in such a way, that displacements and/or deformations of the frame structure are measurable relative to the unloaded reference paths.

Therein, the second or more reference elements may either be designed as further optical reference beams analogous to the first optical reference element as described above. Alternatively, however, one or more of the second or more reference elements may also be designed as a mechanical reference element extending along a part of the frame structure, wherein the mechanical reference element can be fastened fixedly to the frame structure in a substantially unloaded way.

Regarding both optical and mechanical alternatives, as a more general aspect, the second or more reference elements can be arranged on the frame structure for providing a substantially unloaded reference path along a part of the frame structure.

Furthermore, at least one displacement sensor is assigned to the reference elements, wherein the reference elements and the displacement sensor being designed and arranged in such a way, that displacements and/or deformations of the frame structure in the region of the respective parts are measurable relative to the reference paths.

Particularly, the reference elements and the displacement sensors are designed and arranged in such a way, that a distances between the reference paths and defined locations on the frame structure are measurable by the displacement sensors, wherein the distances indicate the displacements and/or deformations of the frame structure in the region of the respective parts.

In general, the reference element may extend over the linear drive mechanism and at least a part of one of the frame components. Therein, the reference element is fixedly fastened to the first frame component and the displacement sensor is arranged in such a way that a distance from the reference element to a defined location on the frame component is measurable. For example, the mechanical reference element may be installed in such a way that it elongates along the linear drive mechanism parallel to the linear moving direction of the movable member, wherein the reference element is mounted in a way decoupled from forces of the frame structure of the CMM. One or more displacement sensors can then be arranged so as to detect a distance between a defined location of the movable member and the mechanical reference element. This distance may indicate a translational displacement of the movable member from an ordinary bearing position (in case of more than one measured distance, also rotational displacements can be indicated).

As known per se from the state of the art, the linear drive mechanism can comprise a linear guide in the first direction, a movable member being supported for movement along the guide by bearings, and a linear measuring instrument for determination of a first drive position of the movable member in the first direction (X,Y,Z). Furthermore, the coordinate measuring machine may comprise a calculation unit for determination of the space coordinate of the point to be measured (and being approached by the probe) as a function of at least the first drive position. According to the invention, also the detected deformation and/or the displacements are considered for the determination of the space coordinate. For example, the sensed displacements and/or deformations may directly be considered when calculating the spatial position of the probe head with respect to a datum position and/or be used in order to compensate for scale errors in connection with determination of the travelling positions by the linear measuring instruments.

Alternatively to the embodiment wherein the reference element extends over a part of the CMM which comprises a drive mechanism, one of the reference elements may also be designed and arranged in such a way that it extends only along a non-movable part of the frame structure (e.g. along at least a part of the legs or the bridge). The reference element can be installed e.g. parallel to and—in particular minimally—distanced apart from a surface of the frame structure. Particularly, the reference element can be fixed to the frame structure only on one of its ends and the displacement sensor may be arranged in order to detect a distance between the other end of the reference element and a facing defined location on the frame structure. That means, only a first end of the reference element is fixedly attached to the frame structure and the displacement sensor is arranged in such a way, that the displacement and/or deformation is indicated by measuring a position of a defined location on the frame structure with respect to the facing second end of the reference element.

As mentioned, one of the second or more reference elements can be designed as an elongated mechanical reference element—e.g. a reference frame or reference rod—extending along a first part of the frame structure. The reference frame or rod is fastened fixedly to the frame structure in a substantially unloaded way. Particularly, the reference frame may be fastened only on one of its ends to the frame structure. The displacement sensor can be built as optical, capacitive or inductive distance sensor and may be arranged either on the reference frame or at the defined location on the frame structure. The sensed distance indicates a deformation of a known part of the frame structure or a displacement in the linear drive mechanism (e.g. a displacement of the movable member from its ordinary bearing position).

The mechanical reference element may be designed from material being highly resistant against deformation caused by temperature, pressure, humidity, aging or similar factors. Exemplarily, the mechanical reference element (e.g. the reference rod) may consist of or comprise invar or carbon fiber material.

Alternatively to a mechanical design of the reference element, according to the invention, the first reference element (and also one or more of the second or more reference elements) can also be designed as optical reference beam, in particular a collimated or focused laser beam, which extends along a known part of the frame structure. The reference beam may be emitted by a laser source mounted directly onto the frame structure on a known location and in a defined and known direction. Particularly, the laser beam in directed parallel to a surface of the CMM frame structure. Therein, the displacement sensor can built as a photosensitive detector element being built for measuring a distance to the reference beam and/or an impinging position of the reference beam. Particularly, the displacement sensor may further comprise a beam splitter for coupling out at least a part of the reference beam and directing it onto the photosensitive detector element. The photosensitive detector element may be designed as a CCD-array, CMOS-array, PSD-sensor or quadrant detector.

Therein, the reference path is functionally generated or represented by the reference element. In case that the reference element is designed as mechanical reference element, the reference path may e.g. be represented by the surface thereof, wherein the shape of the element may high precisely be measured and calibrated before installing it onto the CMM. In case that the reference element is designed as optical reference beam, the path may be represented by the optical axes of the beam.

Furthermore, according to the invention, also two or more displacement sensors, particularly three to five, can be assigned to each reference element, wherein the reference element and the displacement sensors being designed and arranged in such a way, that two or more distances between the first reference element (i.e. reference path) and defined locations on the frame structure are measurable by the displacement sensors. The sensed distances, thus, can indicate displacements and/or deformations of the frame structure in the region of the first part with more than one degree of freedom.

According to the generic art of CMMs, preferably the frame structure comprises four frame components and three linear drive mechanisms moveably linking the four frame components, for provision of movability of the probe head relative to the base in a first, a second and a third direction X,Y,Z. As known per se, each linear drive mechanism may comprise a linear guide in the first, the second respectively the third direction X,Y,Z, a movable member being supported for movement along the guide by bearings and a linear measuring instrument for determination of the first, a second or a third drive position, respectively, of the movable member in the first, the second or the third direction X,Y,Z, respectively. The calculation unit of the CMM can be designed for determination of the space coordinate as a function of at least the first, the second and the third drive position as well as—according to the invention—the deformation and/or the displacement indicated by the displacement sensors.

Summed up, by measuring distances between defined locations on the frame structure and the reference elements/paths, displacements and/or deflections of the frame structure as well as displacements of the travelling members (carriages) can be sensed and determined. As advantage with respect to the state of the art, the method can be used for compensating static changes (changes introduced by friction, etc.) as well as dynamic effects (accelerations of the probe head).

Also a method of compensating errors in a coordinate measuring machine as described above is provided, the CMM determining at least one spatial coordinate of a measurement point on an object to be measured. According to the method, at least one displacement of the frame structure in the region of a first part is measured relative to an external, substantially unloaded, reference element which extends along the first part of the frame structure and is arranged thereon. The errors, particularly weaknesses in a bearing of the linear drive mechanism and/or deformations in the material of the frame structure (caused by the load of the probe and/or variations in temperature, pressure, humidity) are compensated by using at least the determined actual displacement and/or deformation.

Hence, there will be no need (at least not necessarily) to carry out a separate and lengthy calibration procedure of the axis dependent geometrical errors on an assembled machine in advance—as known from the state of the art.

In case that the reference element is designed as an optical reference (collimated laser beam or similar), it can be assumed that the beam is straight and the axis dependent geometrical errors can be measured directly by using the displacement sensors (which measure the deviations with respect to the beam preferably in different directions). In case that the reference element is designed as mechanical reference (e.g. physical beam) the reference beam may separately be measured and calibrated before installing it onto the CMM. By doing so, the same results may be achieved as for the light beam, i.e. that the shape and course of the mechanical reference element is known with high precision. This means in general that the geometrical accuracy is located in the reference element and not in the machine structure.

Hence, because the axis dependent geometrical errors can be sensed in parallel and concurrent to real measurements, the disadvantages of compensating for errors by performing a calibration method according to the state of the art (i.e. time extensive calibration process; different conditions invalidate the calibrations; only fully repeatable errors can be considered; etc.) can be removed or at least reduced significantly according to the invention.

BRIEF DESCRIPTION OF THE DRAWINGS

The invention will be explained in greater detail below with reference to examples of possible embodiments shown schematically in the drawings, in which.

DETAILED DESCRIPTION

Figure 1:
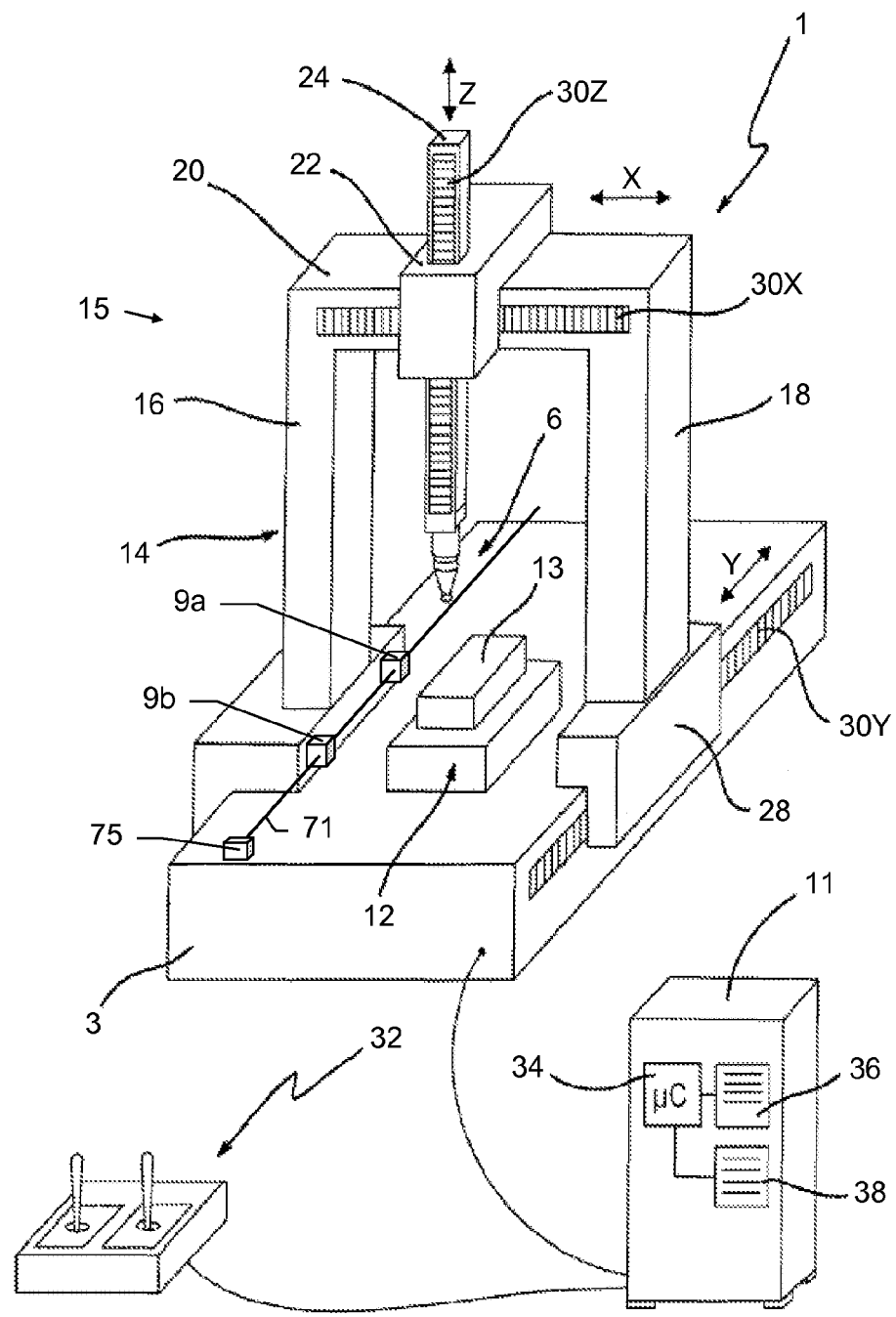
FIG. 1 shows an—exemplarily bridge-type—coordinate measuring machine according to the invention.

In FIG. 1, an exemplary embodiment of the coordinate measuring machine 1 having a frame structure 15 for linking the probe head 6 to the base 3 (wherein the frame structure 15 comprises several frame components 14,22,24 being movable with respect to one another) according to the invention is depicted.

In detail, the coordinate measuring machine 1 comprises the base 3, on which a portal 14 (as one of the frame components)—being supported by bearings—is arranged so that it can be moved in the longitudinal direction (Y-direction). The portal 14 has two portal legs 16,18, which are connected by a bridge 20 at their upper ends.

An X-carriage 22 (as further frame component), which can be driven along the bridge, i.e. in a space direction connecting the two portal legs 16,18 (X-direction), is placed on the bridge 20. A ram or Z-column 24 (as further frame component) can be shifted in a third space direction (Z-direction). Therefore, the Z-column 24 is supported for movement in the Z-direction by bearings which are integral with X-carriage 22. The three space directions X, Y and Z are preferably orthogonal to one another, although this is not necessary for the present invention.

Usually, the components of the frame structure of the CMM (i.e. the X-carriage, X-beam (bridge)) may be made of aluminium, granite, ceramics or steel/iron and has wall-thickness and stiffness adapted to the load.

The two most common types of bearings between the movable members and the guides are air bearings or mechanical bearings (e.g. linear circulating plus rails). The air bearings give the advantage that there is no friction in the movement (which may introduce different kind of errors like angle errors or hysteresis). The disadvantage of air bearings is that the stiffness is normally lower than in mechanical bearings, so that particularly dynamic errors may occur. In mechanical types, the stiffness in the bearing system is normally higher but there is friction and the friction forces may introduce errors. However, the invention may be applied for both types of bearings.

Summed up, the coordinate measuring machine 1 is built for determination of three space coordinates of a measurement point 13 on an object 12 to be measured and, therefore, comprises three linear drive mechanisms for provision of movability of the probe head 6 relative to the base 3 in the first, second and third direction (X, Y and Z direction).

Each linear drive mechanism has a linear guide, one in the first, one in the second and one in the third direction (X, Y and Z direction), respectively. In a simple embodiment, the linear guide of the Y-direction drive mechanism is formed by two edge-building surfaces of the base 3, the linear guide of the X-direction drive mechanism is formed by two or three surfaces of the bridge 20 and the linear guide of the Z-direction drive mechanism is formed by a cubical hole in the X-carriage member.

Furthermore, each linear drive mechanism comprises a movable member being supported for movement along the guide by bearings. In particular, the movable member of the X-direction drive mechanism is embodied as Y-carriage 28 having mutually facing surfaces with respect to the above mentioned two guiding surfaces of the base 3. The movable member of the X-direction drive mechanism is embodied as X-carriage 22 having mutually facing surfaces with respect to the above mentioned two or three guiding surfaces of the bridge 20. And, the movable member of the Z-direction drive mechanism is formed by Z-column 24 having mutually facing surfaces with respect to the inner surfaces of the cubical hole in the X-carriage 22.

Moreover, each linear drive mechanism comprises a linear measuring instrument for determination of a first, a second or a third drive position, respectively, of each movable member in the first, the second or the third direction (X, Y and Z direction), respectively.

A probe head 6, on which a stylus is arranged exemplarily, is fastened on the lower free end of the Z-column 24. The stylus is used in a manner known per se for touching the object 12 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the probe head 6 may be designed for arranging a contact probe, e.g. a scanning or touch trigger probe, or a non-contact probe, particularly an optical, capacitance or inductance probe.

Figure 8:
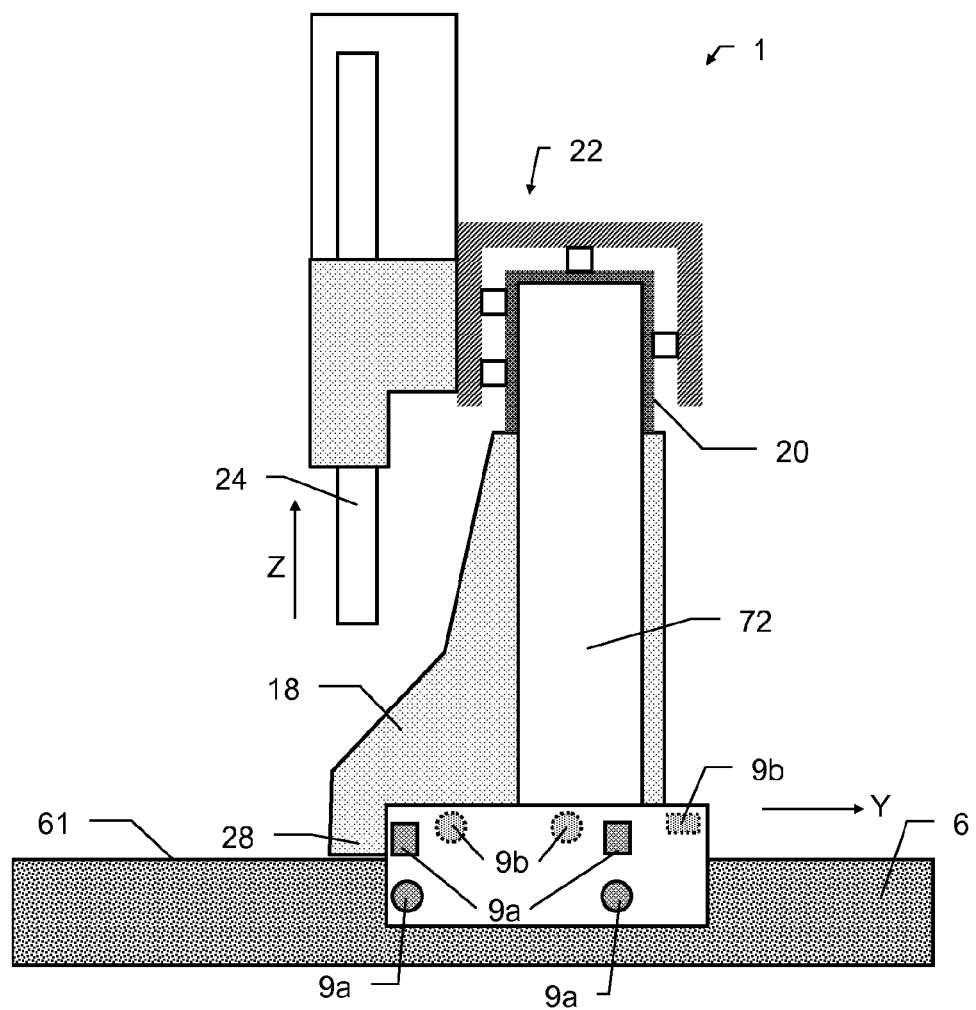
FIG. 8 shows a side view of a bridge-type CMM with a mechanical reference element, wherein displacement sensors are assigned to the reference element.
Figure 9:
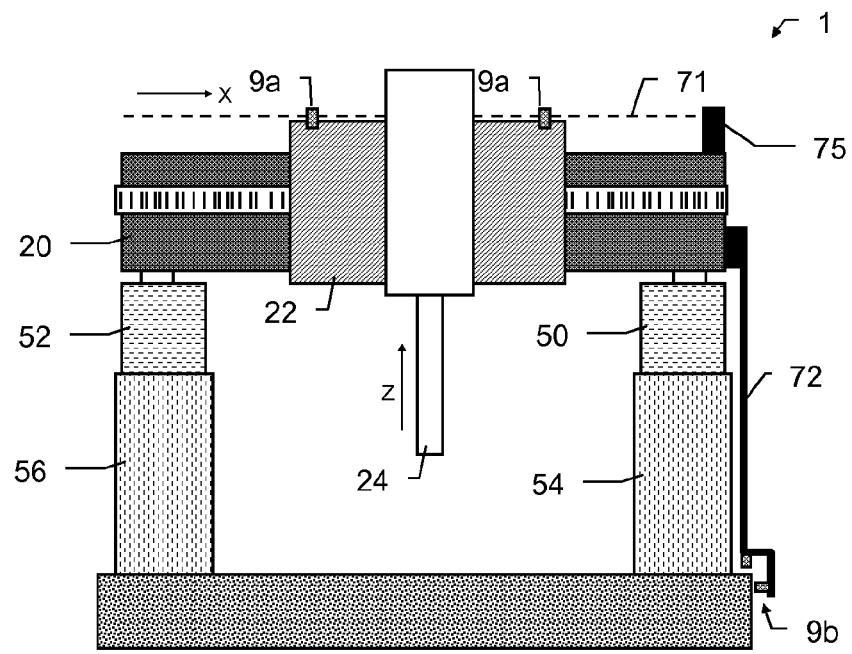
FIG. 9 shows front view of a gantry-type CMM—according to the invention—with a mechanical reference element and an optical reference element.

Furthermore, the invention is not restricted to a coordinate measuring machine in the portal bridge design as shown here. It may equally be used for coordinate measuring machines in gantry design as depicted in FIGS. 8 and 9, in which only the bridge 20 with two supports, functioning as very short feet, can travel along two highly placed fixed rails. Moreover, the invention may generally be used for all types of coordinate measuring machines, i.e. for a CMM being designed as parallel-kinematics machine as well as for a CMM having linear or serial kinematics. Exemplarily, the CMM may be designed in bridge-type, L-bridge-type, horizontal-arm-type, cantilever-type or gantry-type.

In this exemplary embodiment of FIG. 1, the portal legs 16,18 each have a movable Y-carriage 28 which allow movement of the portal 14—including bridge 20—in the Y-direction.

A measuring scale 30Y being part of the Y-measuring instrument is schematically represented on the long side of the base 3, wherein the scale 30Y extends parallel to the Y-direction. The scale may be a glass measuring scale, e.g. having incremental or absolute coding, with which a drive position in the Y-direction of the Y-carriage 28 can be determined. It is to be understood that the measuring instrument may furthermore contain suitable sensors for reading the measuring scale 30Y, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 30X is arranged parallel to the X-direction on the bridge 20. Finally, another measuring scale 30Z is also arranged parallel to the Z-direction on the Z-ram 24. By means of the measuring scales 30X,30Z as part of the linear measuring instruments, it is possible to record the present drive positions of the X-carriage 22 in X-direction and of the Z-column 24 in the Z-direction metrologically in a manner which is known per se.

In the shown embodiment, the base 3 comprises a table with a granite surface plate for supporting an object 12 to be measured, on which the space coordinates of the measurement point 13 are intended to be determined.

Also shown is a control and calculation unit 11, which is designed to actuate the motor drives of the coordinate measuring machine 1 so that the probe head 6 travels to the measurement point 13. For manual operation, the control unit 11 may be connected to a user console 32. It is also possible for the control unit 11 to fully automatically approach and measure measurement points 13 of the object 12 to be measured.

The control and calculation unit 11 contains a processor 34 and a plurality of memories 36,38. In particular, the control and calculation unit 11 is designed for determining the three space-coordinates of the measurement point 13 on the object 12 as a function of at least the first, the second and the third drive position of the three drive mechanisms.

According to the invention, as shown in more detail in the following figures, the reference element 71 may be installed in such a way that it elongates along the linear drive mechanism parallel to the linear moving direction Y of the movable member, wherein the reference element 71 is unloaded and, therefore, decoupled from forces which are carried by the CMM frame structure. For example, the reference element 71 is designed as collimated reference laser beam emitted by a laser source 75. One or more displacement sensors 9a,9b can then be arranged onto the carriage of the movable member so that they are able to detect a distance between defined locations of the movable member and the reference laser beam. These distances indicate a translational or rotational displacement of the movable member from an ordinary bearing position (e.g. a translational displacement in X- and/or Z-direction or a pitching error).

The thereby sensed displacement or displacements, hence, may further be used, for example, in order to
   directly compensate for scale errors in connection with determination of the travelling positions by the linear measuring instruments and/or
   compensate for the sensed horizontal straightness errors, vertical straightness errors, pitching errors, yawing errors and/or rolling errors of the carriage (moving member) in connection with the calculation of the position of the probe head by the control and calculation unit 11 (i.e. when deriving the space coordinate of the measuring point on the object to be measured).

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Figure 2:
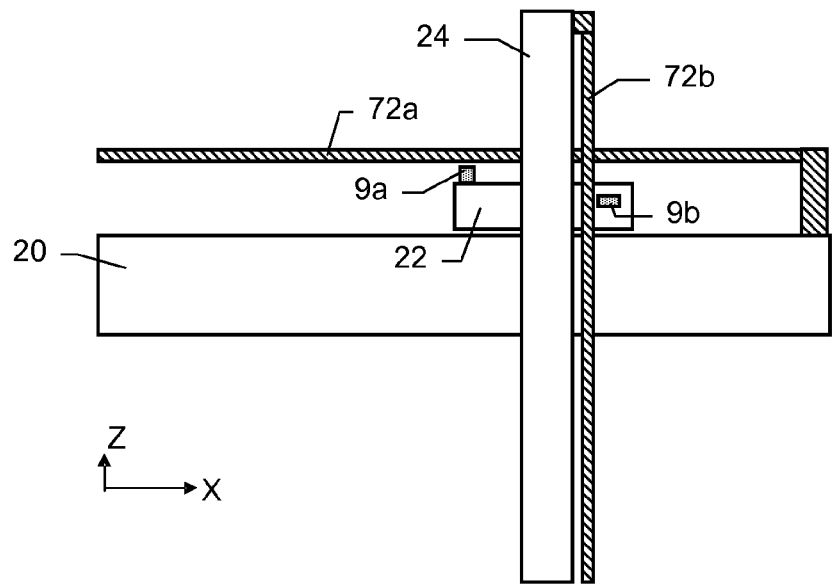
FIG. 2 shows reference rods as mechanical reference elements being mounted to the frame structure only on of its ends.

FIG. 2 shows two reference rods as mechanical reference elements 72a,72b being mounted to the frame structure only on of its ends. Thereby, for sake of simplicity, only the bridge 20 (X-beam) with the X-carriage 22 and the Z-beam 24 are depicted as CMM-components. The X-carriage 22 is supported for linear X-movement with respect to the bridge 20—which itself serves as linear X-guide—by bearings. The Z-guide may be formed by a cubical hole in the X-carriage member 22, through which the Z-beam 24 can be moved along the Z-axis.

The mechanical reference elements 72a,72b are preferably made from a material with a high dimensional stability and high solid gauge, so that it is insusceptible to external influences as temperature, pressure, humidity, aging, etc.

In particular, the mechanical reference elements 72a,72b can be fastened fixedly to the frame structure only on one of its ends in such a way that it extends parallel along a part of the frame structure. This may allow that the reference element is mounted force-decoupled from the frame structure of the CMM, so that the reference path generated by the reference element is completely or at least substantially unloaded.

One displacement sensor 9a is assigned to the first reference rod 72a (which extends along the bridge) for measuring a distance from a defined position of the carriage 22 to the reference path generated by the first reference rod 72a. The displacement sensor 9a may be attached to the carriage 22, so that the distance to the reference path can be measured.

For example, the sensed distance indicates a translational displacement of the carriage 22 from an ordinary bearing position (e.g. a translational displacement in Z-direction of the carriage 22 relative to the guiding surface of the X-beam 20).

Also, one other displacement sensor 9b is assigned to the second reference rod 72b, wherein the second reference rod 72b is fixedly attached—on one of its ends—to the Z-beam 24. The second reference rod 72b extends parallel to and a defined distance apart from the Z-beam 72b, so that displacement-measurements relating to weaknesses in the Z-drive mechanism are independent from a load condition of the z-beam 24. The displacement sensor 9b, therefore, can be mounted onto the X-carriage 22 and face towards the second reference 72b in order to measure a distance form the X-carriage 22 (functioning as guide for the Z-movement of the Z-beam 24) to the second reference rod 72b. This distance relates to an actual bearing distance in the Z-drive mechanism and, therefore, indicates a translational displacement from an ordinary bearing condition in the X-direction.

Figure 3:
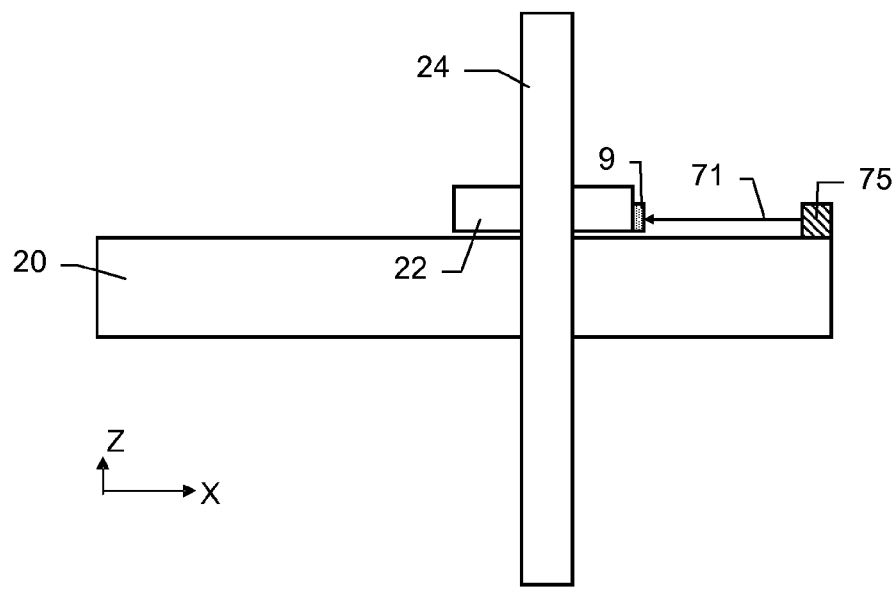
FIG. 3 shows a reference laser beam as optical reference element for the x-carriage.

FIG. 3 shows a collimated or focused reference laser beam 71 as reference element for the x-carriage 22. Thereby, for sake of simplicity, only the bridge 20 (X-beam) with the X-carriage 22 and the z-beam 24 (which is movable relative to the x-carriage 22 in Z-direction) are depicted as CMM-components.

The laser source 75 is installed on one side of the X-beam 20 (CMM-bridge), so that the laser beam 71 behaves in X-direction and parallel to the bridge 20. The reference beam represents the reference path. Exemplarily, the laser source 75 may be designed as a laser diode with collimation optics.

A displacement sensor 9 is assigned to the reference laser beam 71. The displacement sensor 9 is attached to the X-carriage 22 in such a way that it faces towards the laser source 75. The displacement sensor 9 is designed as a photosensitive detector element being built for measuring an impinging position of the reference laser beam 71. For example, the photosensitive detector element may be designed as CCD-martix array, CMOS-matrix array, PSD-sensor (position sensitive device) or quadrant detector.

The sensed impinging position of the laser beam 71 indicates translational displacements of the X-carriage 22 in directions orthogonal to the X-direction (particularly translational displacements in Y- and Z-directions). In case of a collimated beam as reference, the section width of the beam may be defined and, for precisely determining an impinging position of the beam, a center or midpoint of the projected beam spot may be determined as exact impinging position. According to a special embodiment, also the shape of the projected beam spot onto the sensor may be determined, analysed and used for deriving a pitching and/or yawing error of the X-carriage. For example, an ellipsoidal projection of the reference beam wherein the semi-major axis is aligned in Z-direction indicates a pitching error and an ellipsoidal projection of the reference beam wherein the semi-major axis is aligned in Y-direction indicates a yawing error of the X-carriage.

The indicated and determined translational and/or rotational displacements, hence, can be used by the calculation unit of the CMM for determining the spatial coordinates of a measurement point approached by the probe head.

Figure 4:
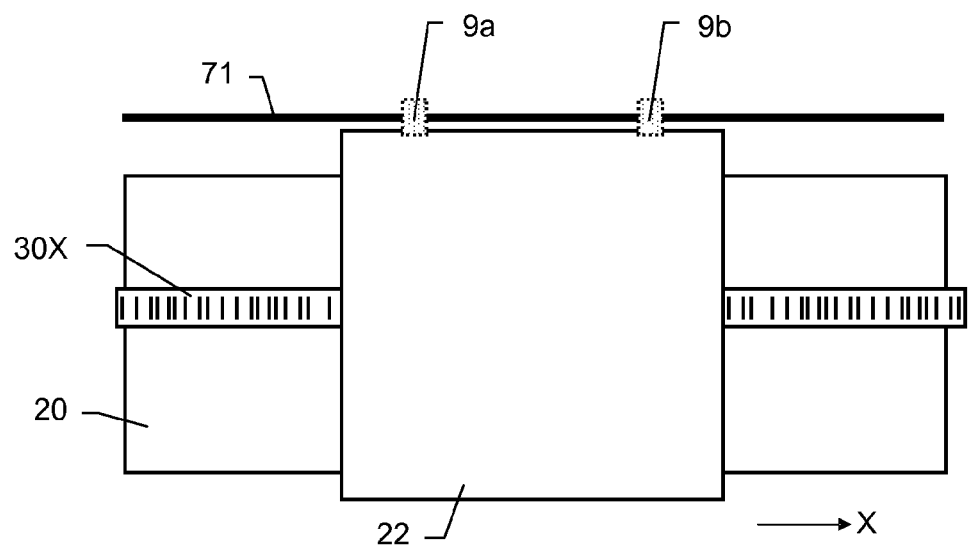
FIG. 4 shows a linear X-drive mechanism, wherein a collimated reference laser beam as reference element extends along the bridge and two displacement sensors are arranged on the X-carriage.

In FIG. 4, a close-up front view of the linear X-drive mechanism of a CMM according to the invention is represented. Similarly to FIG. 3, a collimated or focused reference laser beam 71 is used as optical reference element.

The laser beam 71 behaves in X-direction and parallel to the bridge 20 (X-beam). The reference beam 71 represents the reference path.

Figure 5:
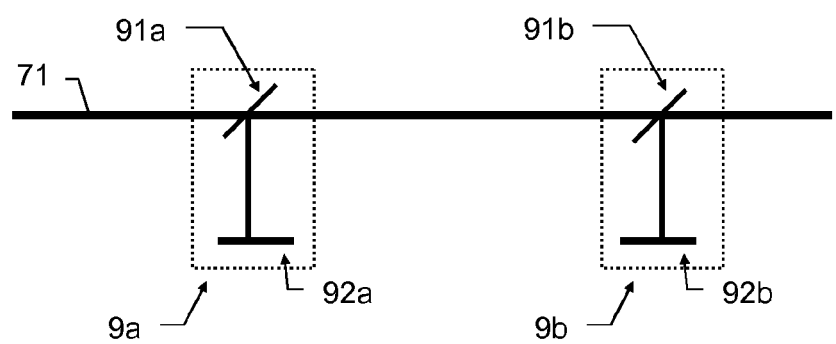
FIG. 5 shows optical displacement sensors, each for measuring a distance from the reference laser beam.

The two displacement sensors 9a,9b being placed on top of the X-carriage 22 (depicted with broken lines) measure displacements of the X-carriage 22 with respect to the reference element 71. As shown in more detail in FIG. 5, the displacement sensors 9a,9b may comprise a beam splitter 91a,91b for coupling out a part of the reference beam 71 and directing it onto a photosensitive detector element 92a,92b. Therein, the photosensitive detector 92a, 92b is built for determining an impinging position of the coupled out and reflected beam. For example, the photosensitive detector 92a,92b may be designed as CCD-matrix array, CMOS-matrix array, PSD-sensor or quadrant detector. Again, the impinging point of the reflected part of the reference beam onto the detector is used for determining translational displacements of the carriage 22 in the Y-Z-plane. By considering the impinging points of the reflected beams detected by both two displacement sensors 9a,9b, also rotational displacements of the carriage 22 (i.e. yawing and pitching error) can be determined (particularly by a differential evaluation of the outputs of both sensors).

Alternatively to the above explained embodiment of the sensors (which comprise a beam splitter for coupling out a part of the reference beam and directing it onto a photosensitive detector element), a transparent photo-sensitive detector element for determining an impinging position of the reference beam may also be used.

Figure 6:
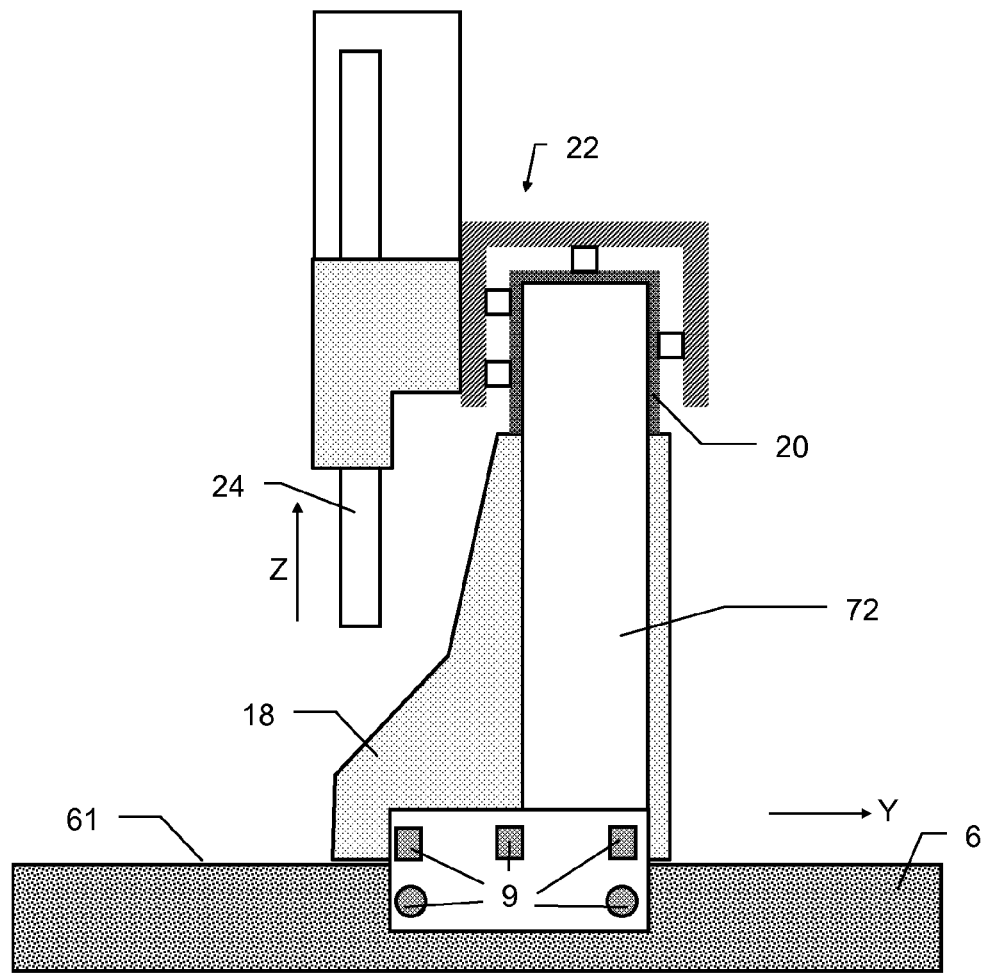
FIG. 6 shows a side view of a bridge-type CMM with a mechanical reference element, wherein displacement sensors are assigned to the reference element.

FIG. 6 shows a side view of a bridge-type CMM 1 with a mechanical reference element 72, wherein displacement sensors 9 are assigned to the reference element 72 in order to measure distances to the table-surface 61.

The frame structure of the CMM is subject to carrying and portative forces. However, according to the invention, the reference element 72 is attached to the frame structure in such a way, that substantially no carrying or portative forces effect onto the reference element 72 (respectively the reference path generated by the reference element).

For example, the mechanical reference element 72 is mounted only on its upper end onto a side of the X-beam 20 (bridge) of the CMM. The reference element 72 extends along the leg 18 and over a part of the edge of the table 6 in such a way, that it is distanced apart (a small distance) from the edge of the table 6.

The reference sensors 9 can be designed as optical or capacitive distance sensors and mounted onto the reference element 72 in such a way that distances from the reference element 72 (i.e. from the positions of the sensors) to the upper and side surface 61 of the table 6 can be measured.

These distances indicate translational and/or rotational displacements in the linear Y-drive mechanism (e.g. translational displacements in X- and Z-direction and rotational displacements like a pitching, rolling and yawing error).

For example, three distance sensors can be mounted to the reference element in order to measure distances to the upper surface of the table (for indicating a translational displacement in Z-direction and a pitching error) and two distance sensors can be mounted to the reference element in order to measure two distances to the side surface of the table (for indicating a translational displacement in X-direction and a yawing error). A rolling error can be derived from a combination of the outputs of the sensors.

As the reference element 72 is mounted directly to the side of the X-beam 20 (bridge), the position of the X-beam 20 (bridge) can directly be referenced relative to the table 6 of the CMM, so that the measurements are independent of actual load conditions of the CMM-legs 18 (or so that the actual load conditions of the CMM-legs 18 can be determined and considered for deriving the measurement position of the probe head).

The sensed displacements, hence, may be used in order to correct the calculation for the position of the probe relative to the base.

Figure 7:
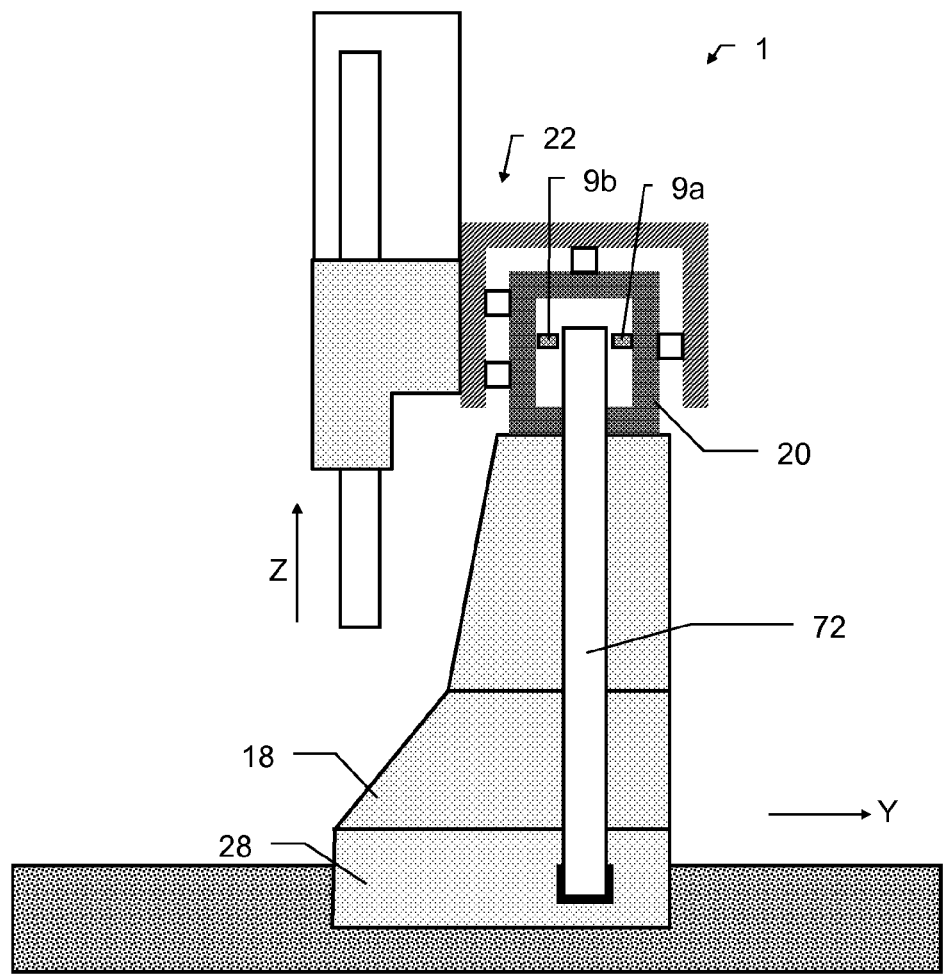
FIG. 7 shows a side view of a bridge-type CMM with a mechanical reference element, wherein displacement sensors are assigned to the reference element.

FIG. 7 shows a side view of a bridge-type CMM with a mechanical reference element 72. The reference element 72 is embodied as reference rod and used in order to sense weaknesses and deformations in the frame structure (i.e. the leg 18) of the CMM. Such weaknesses and deformations in the leg 18 of the CMM-frame structure may for example be caused by load, vibration, dynamic effects, temperature variations, pressure variations, aging, humidity variations, etc.

In the shown embodiment, the reference rod—as reference element 72—is fixedly attached to the foot 28 (Y-carriage) of the CMM-frame structure and extends along the leg 18 until one side of the bridge 20. Two displacement sensors 9a,9b are mounted to the bridge 20, facing towards the loose end of the reference rod 72 (i.e. the free end which is not fixedly attached to the frame structure).

The displacement sensors 9a,9b measure a displacement (i.e. a deformation like e.g. a bending) of the frame structure in that part (i.e. the leg 18), which is spanned by the reference rod 72. Therefore, the positions of the displacement sensors 9a,9b—being mounted to the bridge—are referenced with respect to the upper end of the unloaded reference rod 72.

Exemplarily, a deformation of the leg 18 will cause a change in the distances from the displacement sensors 9a,9b to defined locations on the upper end of the reference rod 72. That distances can be measured by the displacement sensors 9a,9b (being embodied e.g. as optical or capacitive distance sensors) and used in order to calculative compensate for the sensed deformation of the CMM-leg 18 when determining the measuring position.

By using mechanical and/or optical reference elements in the sense of the invention, a high accuracy in the measurements can be ensured, although the load carrying components of the CMM may have comparatively low dimensional stability and low solid gauge. Even in cases that the reference elements themselves loose their required dimensional stability for accurate measurements (i.e. caused by aging effects, etc.), they may be exchanged more easily and under less effort compared to an exchange of aged parts of the frame structure (i.e. the leg). Hence, the lifetime of a CMM may be extended according to the invention, as even in cases of aging effects, the reference elements can be renewed and exchanged comparatively easily and, thus, accurate measurements may continuatively be ensured—by referencing parts of the weak frame structure with respect to reference elements and compensating for the weaknesses according to the invention.

FIG. 8 shows an embodiment, wherein the features of FIGS. 6 and 7 are combined.

Similar to FIG. 6, a side view of a bridge-type CMM 1 with a mechanical reference element 72 is depicted. The mechanical reference element 72 is mounted only on its upper end onto a side of the X-beam 20 (bridge) of the CMM. The reference element 72 extends along the leg 18 and over a part of the edge of the table 6 in such a way, that it is distanced apart (a small distance) from the edge of the table 6 and from the foot 28. Exemplarily, four displacement sensors 9a are installed onto the loose, lower end of the reference element 72 in order to measure distances to the table-surface 61 and, additionally, similar to the embodiment of FIG. 7, three displacement sensors 9b are installed onto the loose, lower end of the reference element 72 in order to measure distances to defined locations of the foot 28. These distances to the foot 28 indicate deformations of the leg component 18.

The reference sensors 9a,9b can be designed as optical or capacitive distance sensors and mounted onto the reference element 72 in such a way that distances from the reference element 72 (i.e. from the positions of the sensors) to the upper and side surface 61 of the table 6—as well as surfaces of the foot 28—can be measured.

The indicated and determined displacements and deformations, hence, can be used in order to correct the calculation for the position of the probe relative to the base.

Applying such a setup—according to the embodiment of FIG. 8—allows for improved compensation of weaknesses in the bearings/joints of the CMM as well as for compensation of weaknesses in the load-carrying frame structure of the CMM (i.e. bending in the leg).

Figure 10:
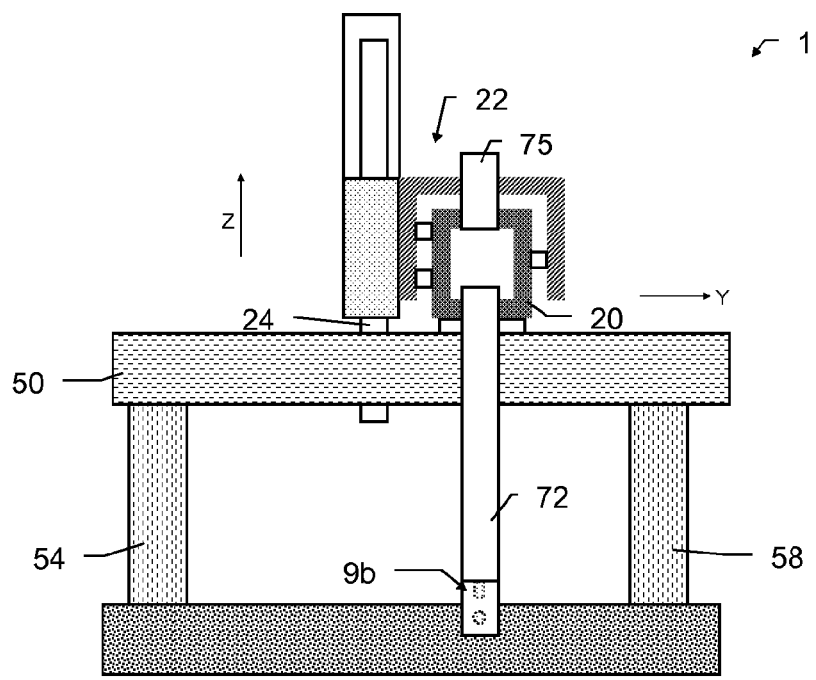
FIG. 10 shows a side view of the gantry-type CMM of FIG. 9.

FIG. 9 and FIG. 10 shows a front respectively a side view of a gantry-type CMM 1—according to the invention—with a second, mechanical reference element 72 and a first, optical reference element 71.

As shown, a gantry-type CMM does not have movable legs/feet between the Y/W- and X-axis 20 (or at least they are very short). The X-beam 20 is directly (i.e. without or with only very short feet) supported for movement by bearings in the Y direction along Y- and W-beams 50,52 which are carried by four pillars 54,56,58. The pillars are rigidly mounted on a measurement table, as known per se to a skilled person. Furthermore, there exist linear measuring instruments in the X-, Y/W- and Z-drive mechanisms (for the sake of simplicity only shown in the X- and Y/W-drive mechanisms).

The second reference element 72 is attached to one side of the X-beam 20 and extends until the edge of the table. Similarly to FIG. 6, displacement sensors 9b mounted to the reference element 72 measure distances to defined locations of the upper and side surface of the table. These distances indicate displacements of the X-beam 20 caused e.g. by weaknesses in the Y-bearings, which support for movement of the bridge 20 (X-beam) relative to the Y- and W-beams 50,52.

Furthermore, analogous to FIG. 4, a collimated or focused reference laser beam is used as first reference element 71. Therefore, a laser source 75 is mounted to one end of the X-beam 20 for projecting the reference laser beam. The laser beam behaves in X-direction and parallel to the bridge 20 (X-beam). The reference beam represents the reference path.

Two displacement sensors 9a are placed on top of the X-carriage 22, the displacement sensors measuring displacements of the X-carriage 22 with respect to the reference beam 71.

These displacements of the X-carriage 22 may e.g. be caused by weaknesses in the X-bearings, which support for movement of the X-carriage 22 relative to the X-beam 20.

Figure 11:
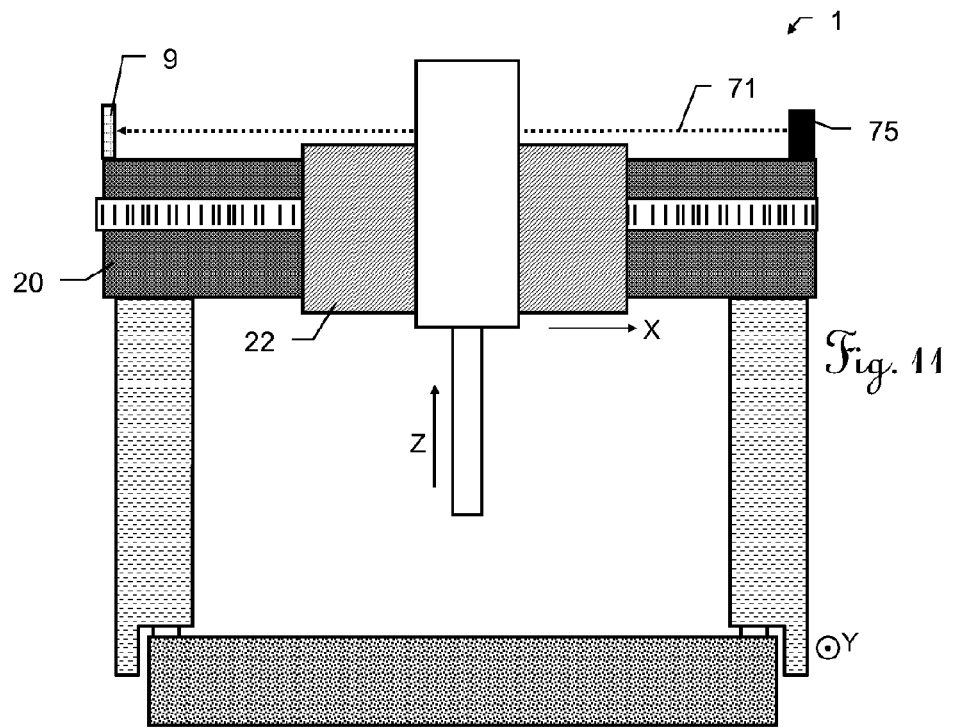
FIG. 11 shows a front view of a bridge-type CMM with an optical reference element for indicating a bending of the bridge.

FIG. 11 shows a front view of a bridge-type CMM with an optical reference element for indicating a bending of the bridge.

The optical reference element is embodied as a collimated or focused reference laser beam 71. The laser source 75 is installed on one side of the X-beam 20 (CMM-bridge), so that the laser beam 71 behaves in X-direction and parallel to the bridge 20. The reference beam 71 represents the reference path.

A displacement sensor 9 is assigned to the reference laser beam 71. Thereby, the displacement sensor 9 is mounted to the other side of the X-beam 20 (CMM-bridge) in such a way that it faces towards the laser source 75. The displacement sensor 9 is designed as a photosensitive detector element being built for measuring an impinging position of the reference laser beam. For example, the photosensitive detector element may be designed as CCD-martix array, CMOS-matrix array, PSD-sensor (position sensitive device) or quadrant detector.

The sensed impinging position of the laser beam 71 indicates a deformation of the X-beam 20. In case of a collimated beam as reference, the section width of the beam may be defined and, for precisely determining an impinging position of the beam, a center or midpoint of the projected beam spot may be determined as exact impinging position. According to a special embodiment, also the shape of the projected beam spot onto the sensor may be determined, analysed and used for deriving a deformation of the X-beam 20.

The impinging position of the reference beam 71 (i.e. the relative position of the sensor with respect to the reference beam) indicates the corresponding dimensional condition (regarding a deflection or bending) of the X-beam 20.

The indicated and derived deformation or deflection of the X-beam 20, hence, can be used by the calculation unit of the CMM for determining the spatial coordinates of a measurement point approached by the probe head.

Figure 12:
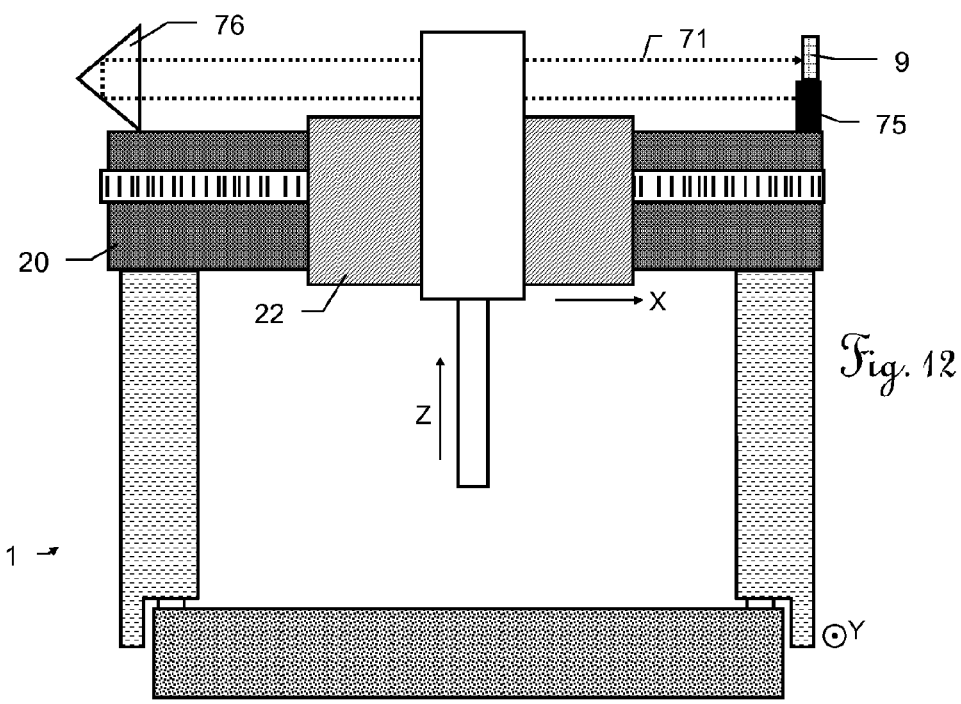
FIG. 12 shows a front view of a bridge-type CMM with an optical reference element for indicating a bending of the bridge.

FIG. 12 shows—similarly to FIG. 11—a front view of a bridge-type CMM 1 with another alternative embodiment of an optical reference element 71 for indicating a deformation, particularly a bending, of the bridge 20.

According the embodiment of FIG. 12, the laser source 75 for the reference laser beam 72 and the sensor 9 are mounted on the same end of the X-beam 20 and on the other end, there is installed a reflector prism 76 for retroreflecting the reference beam 71. The deformations (particularly bending) of the X-beam 20 may be carried out in an analogous way as described in connection with FIG. 11. However, the installation of the laser source 75 and the sensor 9 on one and the same end of the X-beam 20 may provide advantages regarding control and power supply of the laser source 75 and the sensor 9 (connection with the control system).

Figure 13:
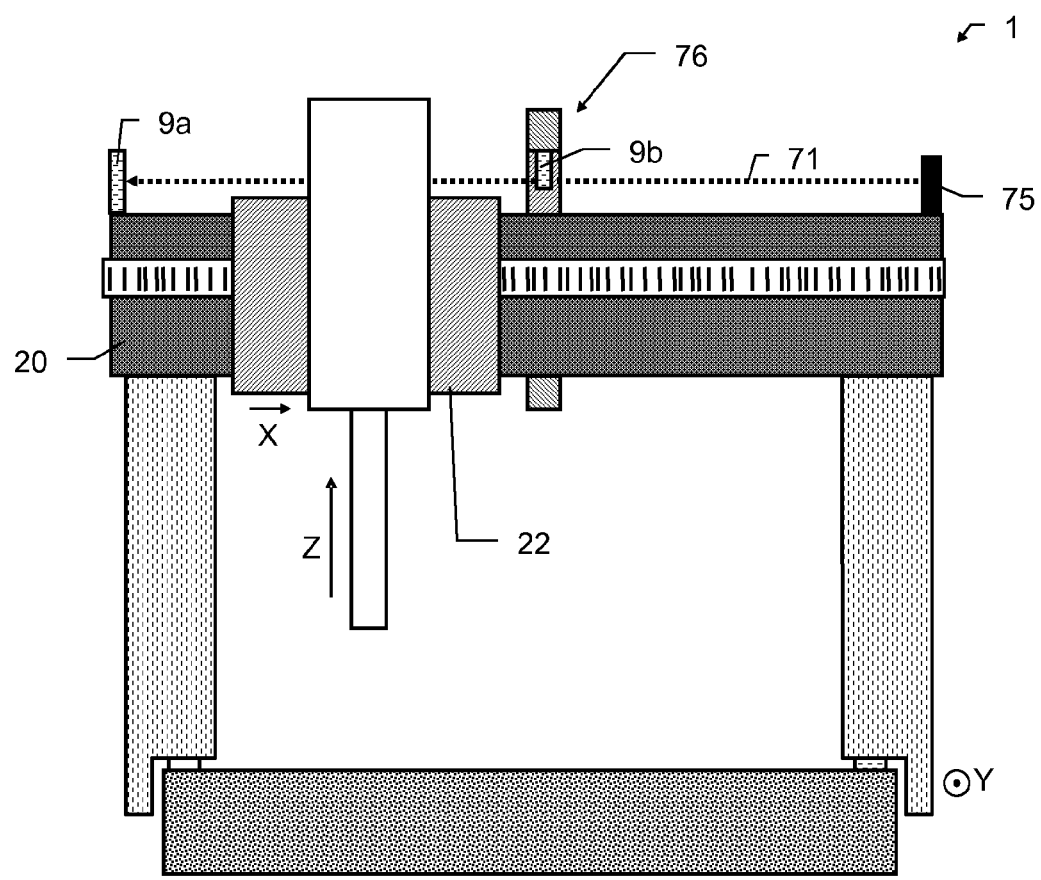
FIG. 13 shows a front view of a bridge-type CMM with an optical reference element for indicating a bending of the bridge.

FIG. 13 shows another embodiment of a bridge-type CMM 1 with an optical reference element 71 for indicating a bending of the bridge 20, similarly to the embodiment as depicted in FIG. 11.

Additionally to the laser source 75 on one end of the X-beam 20 and a first optical sensor 9a on the other end of the X-beam 20 (analogously to FIG. 11), a second optical sensor 9b is installed for measuring a displacement of a position of the X-beam 20 being situated about in the middle of the beam. Exemplarily, the second sensor can be installed onto a mechanical sensor holder 76 which itself is fixed to the lower surface of the X-beam 20 (in order not to disable movement of the X-carriage 22). The sensor 9b indicates a deformation of the X-beam 20 relative to the reference beam 71.

For example, the second displacement sensors 9b may comprise a beam splitter for coupling out a just part of the reference beam 71 and directing it onto a photosensitive detector element. Therein, the photo-sensitive detector may be built for determining an impinging position of the coupled out and reflected beam, as for example already shown in connection with FIG. 5.

The impinging point of the reflected part of the reference beam onto the detector is used for determining a displacement of a position in the middle of the X-beam 20 (where the sensor holder 76 is mounted to the X-beam 20) with respect to the reference beam 71. Therefore, a deformation of the X-beam 20 (i.e. a bending) can be derived from the impinging point and used for compensating the deformation error when calculating the spatial coordinates of a measurement point approached by the probe head.

Alternatively to the above described embodiment of the sensor 9b (i.e. comprising a beam splitter for coupling out a part of the reference beam and directing it onto a photosensitive detector element), also a transparent photosensitive detector element for determining an impinging position of the reference beam may be used as the second displacement sensor.

As described above in connection with the bridge-type CMM, also in connection with other types of CMMs—e.g. L-bridge-type, horizontal-arm-type, cantilever-type, gantry-type, etc.—dynamic movements and geometrical errors in the frame structure (weaknesses in the frame material) and/or error displacements between the moving members and the guides of the X-, Y/W- and Z-drives may accordingly be sensed and compensated for using a reference element (being mounted to the frame structure in an substantially unloaded way) and displacement sensors.

Hence, although the invention is illustrated above, partly with reference to some preferred embodiments, it must be understood that numerous modifications and combinations of different features of the embodiments can be made. All of these modifications lie within the scope of the appended claims.

Some above described embodiments according to the invention are exemplarily shown only for one linear drive mechanism or only for one part of the CMM. However, of course, the inventive approaches may also or alternatively be applied for each of the other drive mechanisms and other parts of the CMM. Furthermore, the inventive concept may be applied for a CMM being designed as parallel-kinematics machine as well as for a CMM having linear or serial kinematics, as shown in the figures.

What is claimed is:

1. A coordinate measuring machine for determination of at least one spatial coordinate of a measurement point on an object to be measured, comprising:
a base;
a probe head for approaching the measurement point,
a frame structure for linking the probe head to the base, the frame structure including:
at least a first and a second frame component; and
at least one linear drive mechanism moveably linking the first and the second frame components, for provision of movability of the probe head relative to the base in a first direction, wherein the at least one linear drive mechanism comprises:
a linear guide in the first direction;
a movable member being supported for movement along the guide by bearings; and
a linear measuring instrument for determination of a first drive position of the movable member in the first direction,
wherein:
at least a first optical reference element designed as an optical reference beam for providing a first reference path, wherein the reference beam extends along the guide of the linear drive mechanism so that the reference path is parallel to the first direction; and
at least a first and a second displacement sensor are assigned to the reference beam, the reference beam and the displacement sensors being designed and arranged in such a way, that two or more distances from defined positions on the movable member to the reference beam and/or impinging positions of the reference beam are measurable by the displacement sensors, wherein the distances respectively impinging positions indicate translational and rotational displacements of the movable member from the ordinary bearing position, wherein at least the first displacement sensor being built so as to partly transmit the optical reference beam and at least the second displacement sensor being assigned to a transmitted part of the optical reference beam and the displacement sensors being built as photosensitive detector elements being built for measuring distances to the reference beam and/or an impinging position of the reference beam indicative of the displacement of the movable member relative to the first reference path in a direction perpendicular to the first direction.

2. The coordinate measuring machine as claimed in claim 1, wherein the displacement sensors further comprise a beam splitter for coupling out at least a part of the reference beam and directing it onto the photosensitive detector elements.

3. The coordinate measuring machine as claimed in claim 2, wherein the photosensitive detector elements are built as CCD-array, CMOS-array, PSD or quadrant detectors.

4. The coordinate measuring machine as claimed in claim 1, wherein the coordinate measuring machine comprises a calculation unit for determination of the space coordinate as a function of at least:
the first drive position and
the translational and/or rotational displacements of the movable member from the ordinary bearing position.

5. The coordinate measuring machine as claimed in claim 1, wherein:
the linear guide is provided on or by the first frame component and the movable member is provided on or by the second frame component, and
a laser source providing for the reference beam is installed on the first frame component and the displacement sensors are attached to the second frame component in such a way that they face towards the laser source.

6. The coordinate measuring machine as claimed in claim 5, wherein the laser source is designed as a laser diode with collimation optics.

7. The coordinate measuring machine as claimed in claim 1, wherein the frame structure comprises:
four frame components and
three linear drive mechanisms moveably linking the four frame components, for provision of movability of the probe head relative to the base in a first, a second and a third direction, each linear drive mechanism including:
a linear guide in the first, the second respectively the third direction;
a movable member being supported for movement along the guide by bearings;
a linear measuring instrument for determination of the first, a second or a third drive position, respectively, of the movable member in the first, the second or the third direction, respectively;
wherein, the coordinate measuring machine comprises a calculation unit for determination of the space coordinate as a function of at least the first, the second and the third drive position and the translational and/or rotational displacements of the movable members from its respective ordinary bearing positions indicated by the displacement sensor.

8. The coordinate measuring machine as claimed in claim 1, wherein:
   a second or more reference elements being arranged on the frame structure, each for providing a substantially unloaded reference path along a part of the frame structure; and
   at least one displacement sensor are assigned to each of the reference elements, the reference elements and the displacement sensors being designed and arranged in such a way, that displacements and/or deformations of the frame structure are measurable relative to the respective reference paths.

9. The coordinate measuring machine as claimed in claim 1, wherein:
   a second or more reference elements being arranged on the frame structure, each for providing a substantially unloaded reference path along a part of the frame structure; and
   two to five displacement sensors are assigned to each of the reference elements, the reference elements and the displacement sensors being designed and arranged in such a way, that displacements and/or deformations of the frame structure are measurable relative to the respective reference paths.

10. The coordinate measuring machine as claimed claim 1, wherein the second or more reference elements each are designed as:
    a mechanical reference frame extending along the respective part of the frame structure, wherein the reference frame being fastened fixedly to the frame structure in a substantially unloaded way, in particular wherein the reference frame is fastened only on one of its ends to the frame structure; or
    a further optical reference beam, in particular a collimated or focused laser beam, which extends along the respective part of the frame structure.

11. The coordinate measuring machine as claimed claim 1, wherein the second or more reference elements each are designed as:
    a collimated or focused laser beam which extends along the respective part of the frame structure.

12. The coordinate measuring machine as claimed in claim 1, wherein the coordinate measuring machine is designed as parallel-kinematics machine or as machine having linear or serial kinematics, particularly wherein the coordinate measuring machine is designed as claimed in one of the following styles:
    bridge-type,
    L-bridge-type,
    horizontal-arm-type,
    cantilever-type, or
    gantry-type.

13. The coordinate measuring machine as claimed claim 1, wherein a contact probe or a non-contact probe is arranged on the probe head; and/or
    the base comprises a table with a granite surface plate for supporting the object to be measured.

14. The coordinate measuring machine as claimed claim 1, wherein a scanning or touch trigger probe is arranged on the probe head.

15. The coordinate measuring machine as claimed claim 1, wherein an optical, capacitance or inductance probe, is arranged on the probe head.

16. A coordinate measuring machine for determination of at least one spatial coordinate of a measurement point on an object to be measured, comprising:
    a base;
    a probe head for approaching the measurement point,
    a frame structure for linking the probe head to the base, the frame structure including:
       at least a first and a second frame component; and
       at least one linear drive mechanism moveably linking the first and the second frame components, for provision of movability of the probe head relative to the base in a first direction, wherein the at least one linear drive mechanism comprises:
          a linear guide in the first direction;
          a movable member being supported for movement along the guide by bearings; and
          a linear measuring instrument for determination of a first drive position of the movable member in the first direction,
    wherein:
       at least a first optical reference element designed as an optical reference beam for providing a first reference path, wherein the reference beam extends along the guide of the linear drive mechanism so that the reference path is parallel to the first direction; and
       three to five displacement sensors are assigned to the reference beam, the reference beam and the displacement sensors being designed and arranged in such a way, that two or more distances from defined positions on the movable member to the reference beam and/or impinging positions of the reference beam are measurable by the displacement sensors, wherein the distances respectively impinging positions indicate translational and rotational displacements of the movable member from the ordinary bearing position, wherein at least the first displacement sensor being built so as to partly transmit the optical reference beam and at least the second displacement sensor being assigned to a transmitted part of the optical reference beam and the displacement sensors being built as photosensitive detector elements being built for measuring distances to the reference beam and/or an impinging position of the reference beam indicative of the displacement of the movable member relative to the first reference path in a direction perpendicular to the first direction.

17. A method of compensating errors in a coordinate measuring machine which determines at least one spatial coordinate of a measurement point on an object to be measured, the coordinate measuring machine including:
    a base;
    a probe head for approaching the measurement point; and
    a frame structure for linking the probe head to the base, wherein the frame structure comprises at least one linear drive mechanism for provision of movability of the probe head relative to the base in a first direction, wherein the at least one linear drive mechanism includes:
       a linear guide in the first direction;
       a movable member being supported for movement along the guide by bearings; and a linear measuring instrument for determination of a first drive position of the movable member in the first direction, wherein the method comprises:

providing a first reference path parallel to the first direction by generating an optical reference beam extending along the guide of the linear drive mechanism;

measuring at least two displacements of the movable member relative to the first reference path so that the displacements are indicative of a translational and rotational displacement of the movable member from an ordinary bearing position, wherein measuring the displacements is provided by displacement sensors being built as photosensitive detector elements being built for measuring distances to the reference beam and/or an impinging position of the reference beam indicative of the displacement of the movable member relative to the first reference path in a direction perpendicular to the first direction and at least a first displacement sensor being partly transmissible for the optical reference beam and at least a second displacement sensor being assigned to a transmitted part of the optical reference beam; and compensating for the errors by using the determined actual at least one displacement.

18. The method as claimed in claim 17, wherein the errors compensated for include weaknesses in the bearing of the linear drive mechanism.

* * * * *